US009122869B1

(12) United States Patent
Sobel et al.

(10) Patent No.: US 9,122,869 B1
(45) Date of Patent: Sep. 1, 2015

(54) SYSTEMS AND METHODS FOR DETECTING CLIENT TYPES

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 71 days.

(21) Appl. No.: 13/875,269

(22) Filed: May 1, 2013

(51) Int. Cl.
H04L 29/06 (2006.01)
G06F 21/00 (2013.01)
G06F 21/55 (2013.01)

(52) U.S. Cl.
CPC ............... *G06F 21/55* (2013.01); *H04L 63/20* (2013.01)

(58) Field of Classification Search
CPC ......... G06F 21/55; G06F 21/50; G06F 21/56; H04L 63/20; H04L 63/1425; H04L 63/1441; H04L 63/1483
See application file for complete search history.

(56) References Cited

U.S. PATENT DOCUMENTS

2011/0202672 A1\* 8/2011 Narayanaswamy et al. .. 709/230

OTHER PUBLICATIONS

Rob Reid; Trying to Detect Spoofed User-Agents; Strictly-Software. com; http://blog.strictly-software.com/2008/11/trying-to-detect-spoofed-user-agents.html; Nov. 24, 2008; as accessed on Feb. 20, 2013.

\* cited by examiner

*Primary Examiner* — Izunna Okeke
(74) *Attorney, Agent, or Firm* — ALG Intellectual Property, LLC

(57) ABSTRACT

A computer-implemented method for detecting client types may include identifying a communication from a client system transmitted according to a network protocol, analyzing the communication to determine at least one protocol implementation characteristic that describes how the client system implemented the network protocol in the communication, submitting the protocol implementation characteristic to a protocol implementation database that correlates client types with protocol implementation characteristics and receiving, in response to submitting the protocol implementation characteristic, a client type of the client system. Various other methods, systems, and computer-readable media are also disclosed.

20 Claims, 6 Drawing Sheets

SYSTEMS AND METHODS FOR DETECTING CLIENT TYPES

BACKGROUND

In the digital age, organizations increasingly rely on digitally-stored data and computing services to conduct their day-to-day operations. Many organizations may wish to provide network access to data, computing services, and/or other computing resources.

In order to meet digital security objectives, some organizations may wish to restrict and/or analyze access network connection attempts based on information about the client device that is attempting a network connection. For example, an organization may wish to exclude connections from certain computing platforms for security reasons.

Some traditional systems may ascertain a client system's type (e.g., the platform of the client system) by accepting self-reported client type information from the client system. Unfortunately, this may allow attackers, non-compliant users, and/or non-compliant applications to easily circumvent security policies that are based on client types by spoofing client type information for client systems. Accordingly, the instant disclosure identifies and addresses a need for additional and improved systems and methods for detecting client types.

SUMMARY

As will be described in greater detail below, the instant disclosure generally relates to systems and methods for detecting client types by analyzing client network protocol implementations for distinctive implementation fingerprints that correspond to specific client types. In some examples, these systems and methods may then restrict access to network resources to certain client types and/or detect instances of user agent spoofing.

In one example, a computer-implemented method for detecting client types may include (1) identifying a communication from a client system transmitted according to a network protocol, (2) analyzing the communication to determine at least one protocol implementation characteristic that describes how the client system implemented the network protocol in the communication, (3) submitting the protocol implementation characteristic to a protocol implementation database that correlates client types with protocol implementation characteristics and (4) receiving, in response to submitting the protocol implementation characteristic, a client type of the client system.

In some examples, the computer-implemented method may further include restricting access to a resource from the client system based on the client type of the client system received from the protocol implementation database.

In some examples, restricting access to the resource from the client system may include: (1) determining a security attribute of the client system based on the client type of the client system and (2) identifying an access policy that excludes client systems with the security attribute from accessing the resource.

In some examples, identifying the communication from the client system may include receiving a user agent identifier from the client system purporting to identify the client type of the client system In some examples, the computer-implemented method may further include determining that the user agent identifier was spoofed by comparing the user agent identifier with the client type of the client system and determining that the user agent identifier may not match the client type of the client system.

In some examples, the computer-implemented method may further include restricting access to a resource from the client system based on determining that the user agent identifier was spoofed.

In some examples, the computer-implemented method may further include identifying the communication as an intrusion attempt based at least in part on determining that the user agent identifier was spoofed.

In one embodiment, the protocol implementation database may have been generated at least in part by: (1) gathering a plurality of instances of communication via a protocol from a plurality of client systems and a plurality of client type identifiers from the plurality of client systems, (2) analyzing the plurality of instances of communication to extract a plurality of protocol implementation features and (3) statistically correlating the plurality of protocol implementation features with the plurality of client type identifiers.

In one embodiment, the client type may include at least one of: (1) an identifier of an application that sent the communication from the client system, (2) an identifier of an operating system of the client system, (3) an identifier of a hardware architecture of the client system and/or (4) an identifier of a model of the client system.

In one embodiment, the protocol implementation characteristic may include a characteristic arising from an implementation of the network protocol that conforms to a specification of the network protocol but which may be not required by the specification of the network protocol.

In one embodiment, a system for implementing the above-described method may include (1) an identification module that identifies a communication from a client system transmitted according to a network protocol, (2) an analyzing module that analyzes the communication to determine at least one protocol implementation characteristic that describes how the client system implemented the network protocol in the communication, (3) a submission module that submits the protocol implementation characteristic to a protocol implementation database that correlates client types with protocol implementation characteristics, (4) a receiving module that receives, in response to submitting the protocol implementation characteristic, a client type of the client system and (5) at least one processor configured to execute the identification module, the analyzing module, the submission module and the receiving module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a communication from a client system transmitted according to a network protocol, (2) analyze the communication to determine at least one protocol implementation characteristic that describes how the client system implemented the network protocol in the communication, (3) submit the protocol implementation characteristic to a protocol implementation database that correlates client types with protocol implementation characteristics and (4) receive, in response to submitting the protocol implementation characteristic, a client type of the client system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
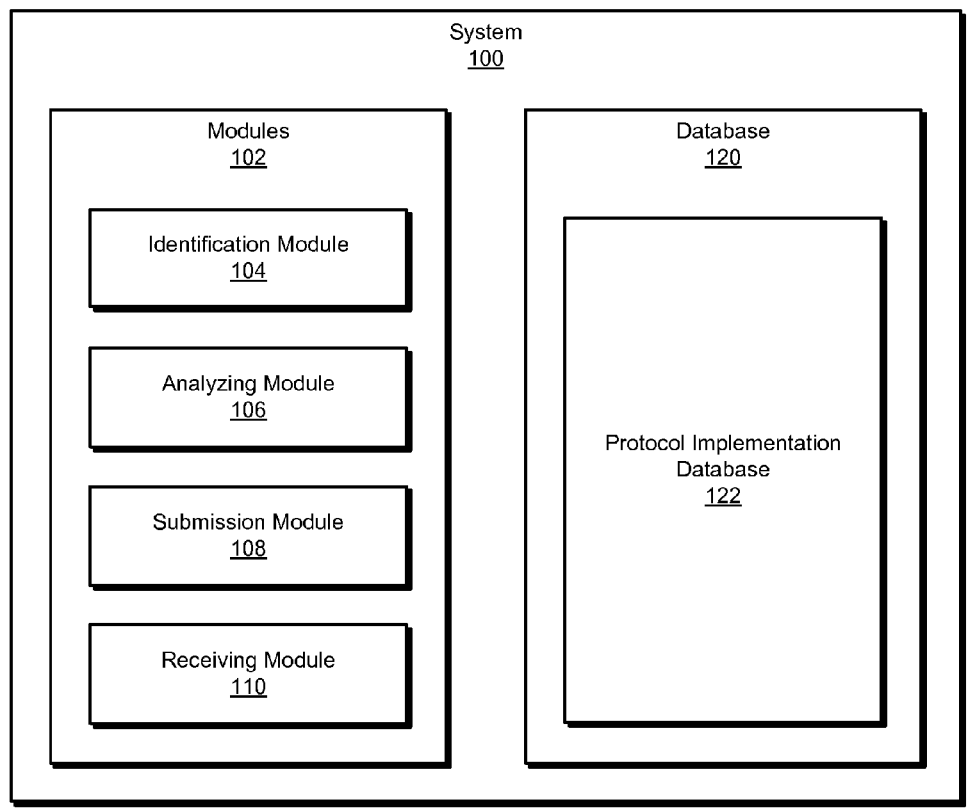
FIG. 1 is a block diagram of an exemplary system for detecting client types.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for detecting client types. As will be explained in greater detail below, by analyzing client network protocol implementations for distinctive implementation fingerprints that correspond to specific client types, the systems and methods described herein may facilitate the accurate enforcement of client-based security policies. For example, these systems and methods may restrict access to network resources to certain client types and/or detect instances of user agent spoofing.

Figure 2:
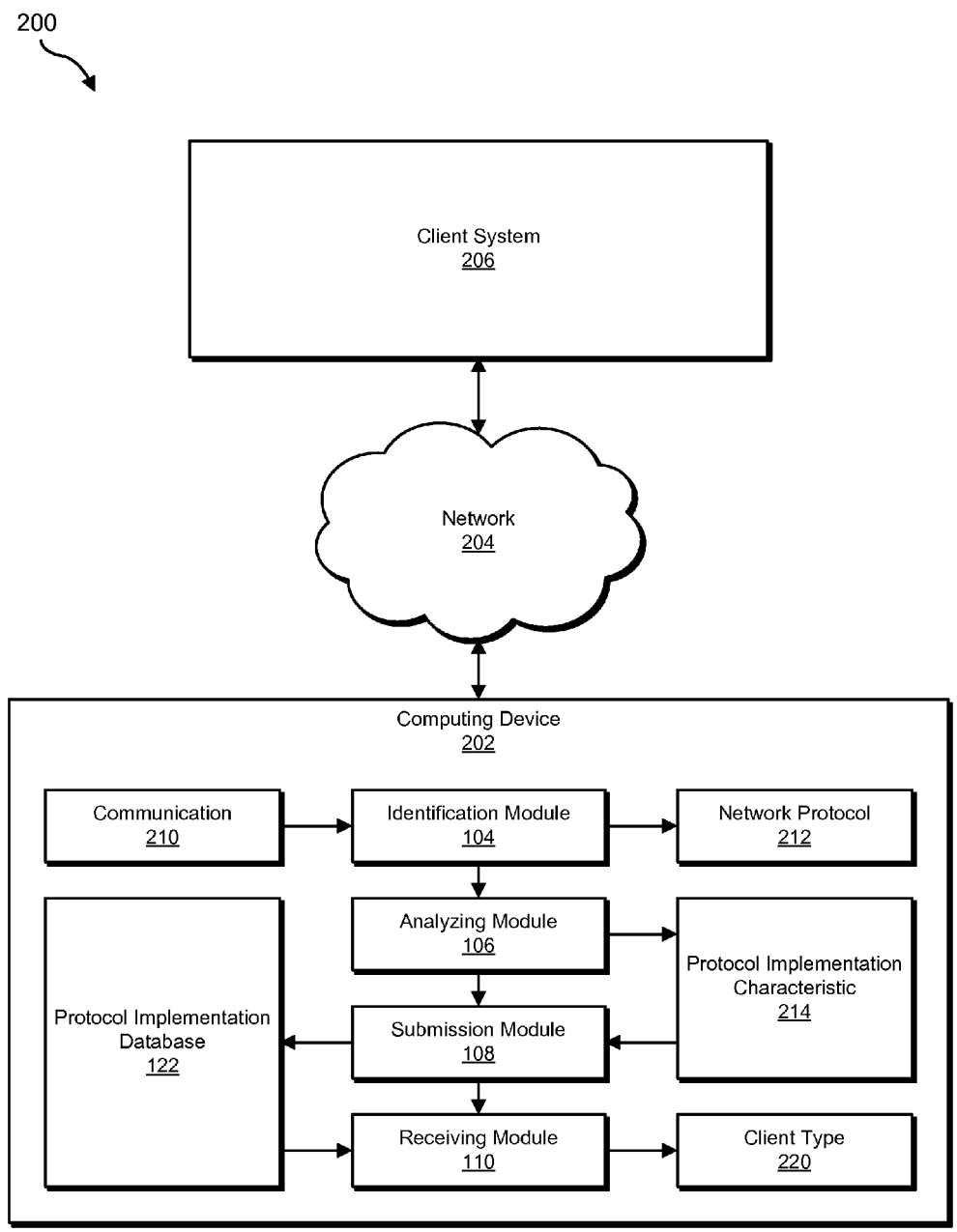
FIG. 2 is a block diagram of an exemplary system for detecting client types.
Figure 3:
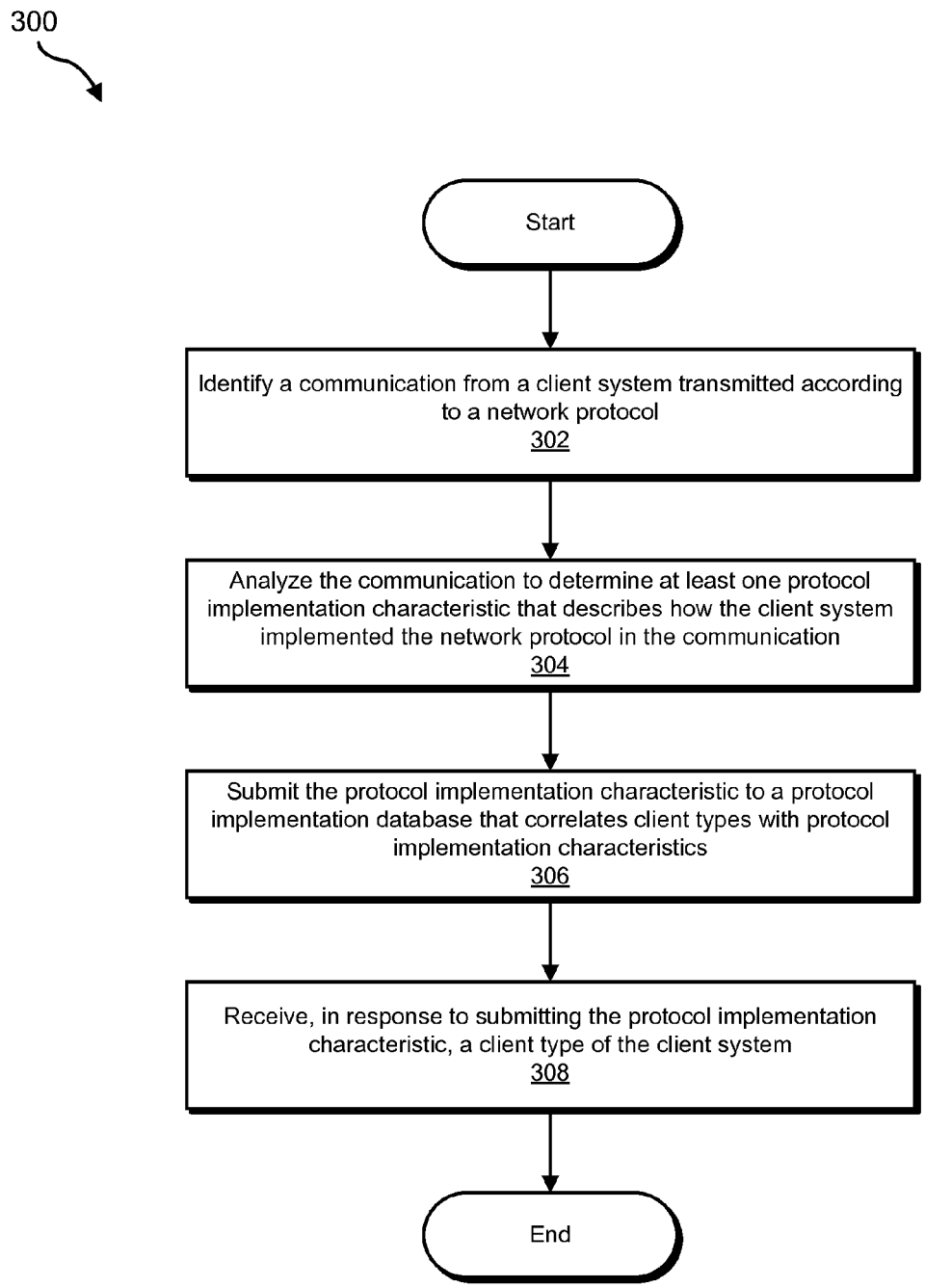
FIG. 3 is a flow diagram of an exemplary method for detecting client types.
Figure 4:
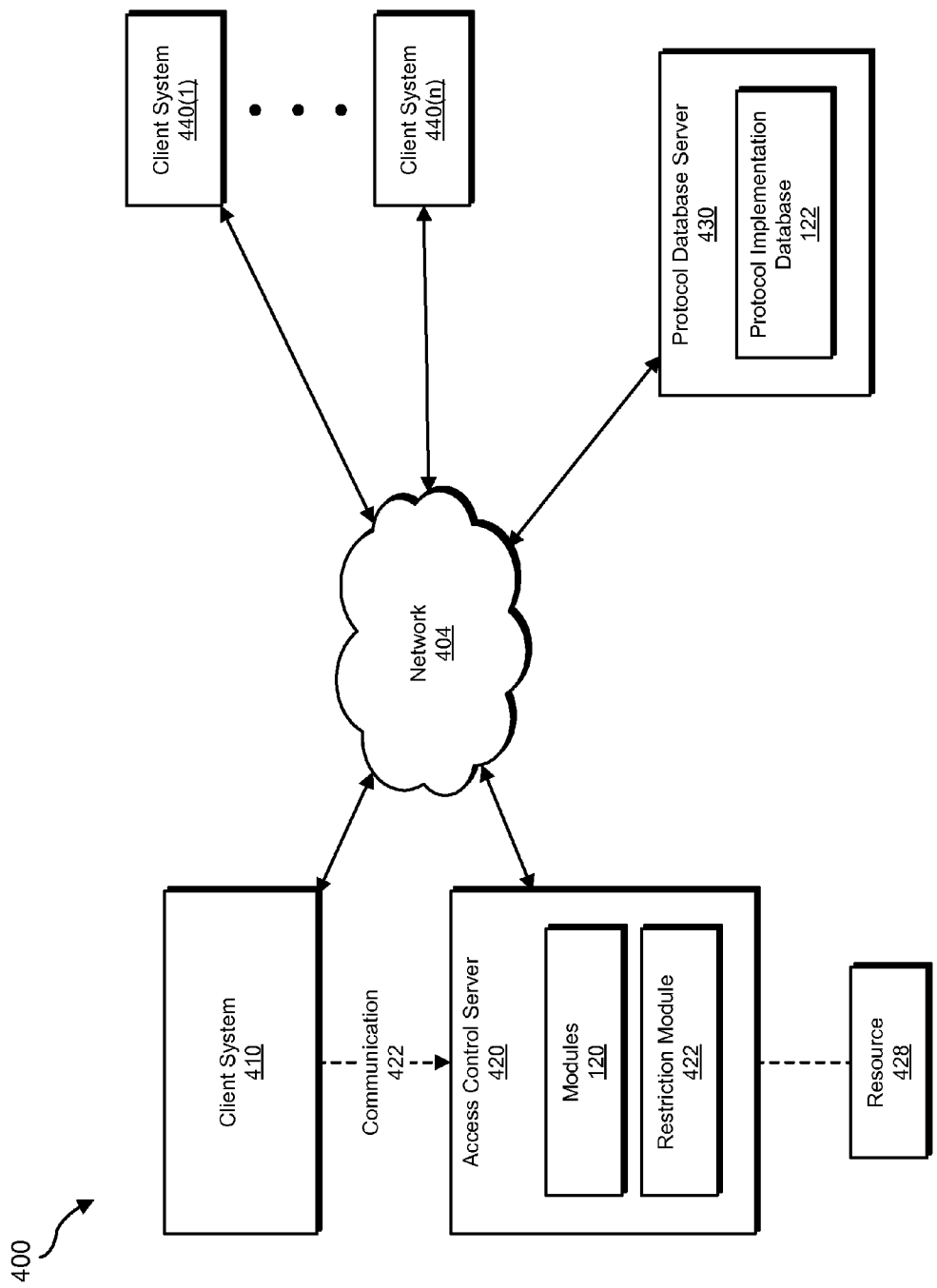
FIG. 4 is a block diagram of an exemplary system for detecting client types.

The following will provide, with reference to FIGS. 1, 2, and 4, detailed descriptions of exemplary systems for detecting client types. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting client types. As illustrated in this figure, exemplary system 100 may include one or more modules 102 for performing one or more tasks. For example, and as will be explained in greater detail below, exemplary system 100 may also include an identification module 104 that may identify a communication from a client system transmitted according to a network protocol. Exemplary system 100 may additionally include an analyzing module 106 that may analyze the communication to determine at least one protocol implementation characteristic that describes how the client system implemented the network protocol in the communication. Exemplary system 100 may also include a submission module 108 that may submit the protocol implementation characteristic to a protocol implementation database that correlates client types with protocol implementation characteristics. Exemplary system 100 may additionally include a receiving module 110 that may receive, in response to submitting the protocol implementation characteristic, a client type of the client system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include a protocol implementation database 122 configured to store protocol implementation details relating to one or more types of client systems (e.g., software and/or hardware stacks, platforms, applications, etc.).

Database 120 may represent portions of a single database or computing device or a plurality of databases or computing devices. For example, database 120 may represent a portion of client system 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204. Computing device 202 may be programmed with one or more of modules 102 and/or may store all or a portion of the data in database 120. Additionally or alternatively, a remote server may be programmed with one or more of modules 102 and/or may store all or a portion of the data in database 120.

In one embodiment, one or more of modules 102 from FIG. 1 may, when executed by at least one processor of computing device 202, facilitate computing device 202 in detecting client types. For example, client system 206 may attempt to access a computing resource via computing device 202, which may ascertain the client type of client system 206 in order to apply one or more security policies to the access attempt by client system 206. For example, and as will be described in greater detail below, identification module 104 may be programmed to identify a communication 210 from client system 206 transmitted according to a network protocol 212. Analyzing module 106 may be programmed to analyze communication 210 to determine at least one protocol implementation characteristic 214 that describes how client system 206 implemented network protocol 212 in communication 210. Submission 108 may be programmed to submit protocol implementation characteristic 214 to a protocol implementation database 122 that correlates client types with protocol implementation characteristics. Receiving module 110 may be programmed to receive, in response to submitting protocol implementation characteristic 214, a client type 220 of client system 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Client system 206 generally represents any type or form of computing device, platform, and/or software capable of communicating over a network. Examples of client system 206 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and client system 206.

FIG. 3 is a flow diagram of an exemplary computer-implemented method 300 for detecting client types. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a communication from a client system transmitted according to a network protocol. For example, at step 302 identification module 104 may, as part of computing device 202 in FIG. 2, identify a communication 210 from client system 206 transmitted according to a network protocol 212.

The communication may include any data transmitted in an implementation and/or use of the network protocol. In some examples, the communication may include multiple transmissions across a protocol session. As used herein, the phrase "network protocol" may refer to any protocol and/or group of protocols used for network communications. For example, the network protocol may include one or more protocols within the Internet protocol suite (i.e., the "TCP/IP" protocol suite). In some examples, the network protocol may include an application-layer protocol and/or a protocol whose implementation may be affected at the application layer.

In some examples, identification module 104 may receive a user agent identifier from the client system that purports to identify the client type of the client system. For example, the user agent identifier may include a Hypertext Transfer Protocol ("HTTP") based "User-Agent" header. In some examples, the user agent identifier may include information about a purported application that sent the communication from the client system, a purported operating system of the client system, a purported platform of the client system, and/or other purported information about a purported system stack of the client system that sent the communication.

Identification module 104 may identify the communication in any suitable context. For example, identification module 104 may identify the communication as a part of a server that controls access to a computing resource. Accordingly, identification module 104 may intercept and/or monitor the communication to apply one or more security policies to determine whether to grant access to the computing resource to the client system.

FIG. 4 illustrates an exemplary system 400 for detecting client types. As shown in FIG. 4, exemplary system 400 may include a client system 410 in communication with an access control server 420 via a network 404. Using FIG. 4 as an example, identification module 104 may, as a part of access control server 420, identify a communication 422 from client system 410.

Returning to FIG. 3, at step 304 one or more of the systems described herein may analyze the communication to determine at least one protocol implementation characteristic that describes how the client system implemented the network protocol in the communication. For example, at step 304 analyzing module 106 may, as part of computing device 202 in FIG. 2, analyze communication 210 to determine at least one protocol implementation characteristic 214 that describes how client system 206 implemented network protocol 212 in communication 210.

As used herein, the phrase "protocol implementation characteristic" may refer to any characteristic of a protocol implementation that may be used to distinguish a configuration and/or property of an originating client system. For example, the protocol implementation characteristic may include a characteristic arising from an implementation of the network protocol that conforms to a specification of the network protocol but which is not required by the specification of the network protocol. For example, the protocol implementation characteristic may include an initial value selected by the client system for a sequence of values to be transmitted according to the network protocol, where the initial value is not specified by the network protocol but which is permissible within the network protocol. As another example, the protocol implementation characteristic may include an incrementation scheme for a sequence and/or series of values used within the network protocol where the particular incrementation scheme is not specified by the network protocol. In some examples, the protocol implementation characteristic may include a selected Time-to-live ("TTL") value. In some examples, the protocol implementation characteristic may include one or more features and/or patterns observed in the communication.

Analysis module 106 may analyze the communication in any suitable manner. For example, analysis module 106 may parse the communication to extract relevant features of the communication that may reveal implementation details of the network protocol by the client system.

Returning to FIG. 3, at step 306 one or more of the systems described herein may submit the protocol implementation characteristic to a protocol implementation database that correlates client types with protocol implementation characteristics. For example, at step 306 submission 108 may, as part of computing device 202 in FIG. 2, submit protocol implementation characteristic 214 to protocol implementation database 122 that correlates client types with protocol implementation characteristics.

The protocol implementation database may include any data structure, data set, and/or other collection of information capable of correlating client types with protocol implementation characteristics. In some examples, the protocol implementation database may include a machine learning classifier and/or other machine-learning based model.

In some examples, the protocol implementation database may have been generated by (1) gathering a plurality of instances of communication via a protocol from a plurality of client systems and a plurality of client type identifiers from the plurality of client systems, (2) analyzing the plurality of instances of communication to extract a plurality of protocol implementation features and (3) statistically correlating the plurality of protocol implementation features with the plurality of client type identifiers. For example, one or more data-gathering systems may communicate with the plurality of client systems using one or more protocols of interest (e.g., including the network protocol) to observe differences and/or similarities between protocol implementation details of the client systems according to their client type identifiers. In some examples, these data-gathering systems may determine that the client systems are trustworthy (and therefore trust the client type identifiers sent by the client systems as accurate). Additionally or alternatively, these data-gathering systems may determine that aberrations in data gathered represent a misreported (e.g., spoofed) client type identifier and filter out such outlier data.

Using FIG. 4 as an example, a protocol database server 430 may have gathered client type information from each of client systems 440(1)-(*n*) as well as corresponding protocol implementation details from communications originating from client systems 440(1)-(*n*). In this example, protocol database server 430 may analyze the gathered data and store correlation information in protocol implementation database 122. At a later time, submission module 108 may, as a part of access control server 420, submit protocol implementation details observed in communication 422 to protocol database server 430.

Returning to FIG. 3, at step 308 one or more of the systems described herein may receive, in response to submitting the protocol implementation characteristic, a client type of the client system. For example, at step 308 receiving module 110 may, as part of computing device 202 in FIG. 2, receive, in response to submitting protocol implementation characteristic 214, a client type 220 of client system 206.

As used herein, the phrase "client type" may refer to any attribute of a client system (and/or representation of such an attribute) that may affect the implementation of the network protocol by the client system and/or that may be implicated in a security policy regulating access to a computing resource by the client type. In some examples, the client type may include an identifier of an application that sent the communication from the client system. For example, the client type may identify a MICROSOFT ACTIVESYNC client or an ANDROID TOUCHDOWN email client. In some examples, the identifier of the application may include a version of the application. Additionally or alternatively, the application may include a module, library, and/or platform included within and/or used by the application. In some examples, the client type may include an identifier of an operating system of the client system (including, in some examples, a version of the operating system and/or a patch of the operating system). For example, the client type may include APPLE IOS 4, APPLE IOS 6, ANDROID, or MICROSOFT WINDOWS 8. In some examples, the client type may include an identifier of a hardware architecture of the client system (e.g., x86). In some examples, the client type may include an identifier of a model of the client system. For example, the client type may include IPHONE 3GS or MICROSOFT SURFACE TABLET.

In some examples, a restriction module (e.g., restriction module 422 in FIG. 4) may restrict access to a resource from the client system based on the client type of the client system received from the protocol implementation database. As used herein, the term "resource" may refer to any data, service, and/or system that may be accessed and/or used by a client system. For example, restriction module 422 may restrict client system 410 from accessing a resource 428 based on the client type of client system 410. As another example, the restriction module may operate as a part of an ACTIVESYNC email gateway and disallow ACTIVESYNC access to the client system based on the client type of the client system (e.g., the client system running an outdated version of an APPLE IOS operating system).

In some examples, the restriction module may determine a security attribute of the client system based on the client type of the client system and identify an access policy that excludes client systems with the security attribute from accessing the resource. For example, the restriction module may determine that the client system is of a client type that does not support a data-loss-prevention standard required to access the resource.

In some examples, the restriction module may restrict access to a list of approved client types. For example, the restriction module and/or a separate security system may ensure secure communications with client devices by operating within the assumption that observed communications from a client device will comport with patterns found in the list of approved client types. By knowing how both endpoints in a communication are expected to implement a protocol, the restriction module may target unexpected behaviors from a given client type as suspect.

As mentioned earlier, in some examples one or more of the systems described herein may have received a user agent identifier from the client system that purports to identify the client type of the client system. In these examples, the restriction module may determine that the user agent identifier was spoofed by comparing the user agent identifier with the client type of the client system and determining that the user agent identifier does not match the client type of the client system. In some examples, upon determining that the user agent identifier was spoofed, the restriction module may perform a remediation action. For example, the restriction module may restrict access to a resource from the client system based on determining that the user agent identifier was spoofed. In some examples, the restriction module may use the determination that the user agent identifier was spoofed in an intrusion detection evaluation. For example, the restriction module may identify the communication as an intrusion attempt based at least in part on determining that the user agent was spoofed.

As described above, in some examples the restriction module may restrict access to a resource from the client system based on determining that the user agent identifier was spoofed. Additionally or alternatively, the restriction module may restrict access to a resource from a user account that sent the communication based on determining that the user agent identifier (sent on behalf of the user account) was spoofed. For example, the restriction module may ban a user account from accessing the resource based on a number of times that the user account has attempted to achieve access by spoofing the user agent identifier. In some examples, the restriction module may track access attempts by the user account across sessions and/or devices. For example, a user may attempt access by spoofing the user agent identifier on five separate occasions, after which the restriction module may ban the user account from access (e.g., even access from client devices of an allowed client type). Accordingly, the user may be unable to access the resource from any client device through the user account (e.g., until an administrator restores access for the user account).

Figure 5:
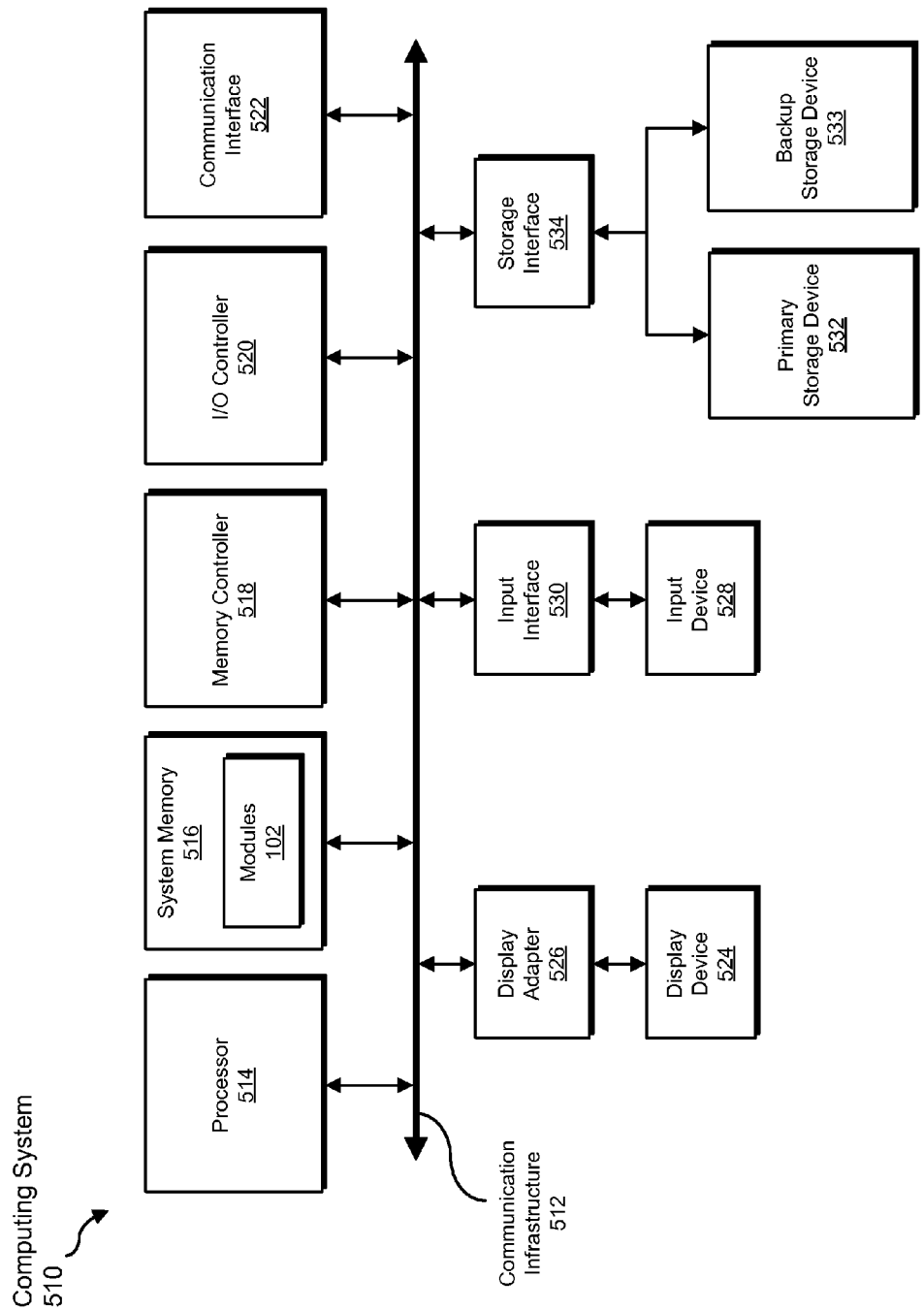
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
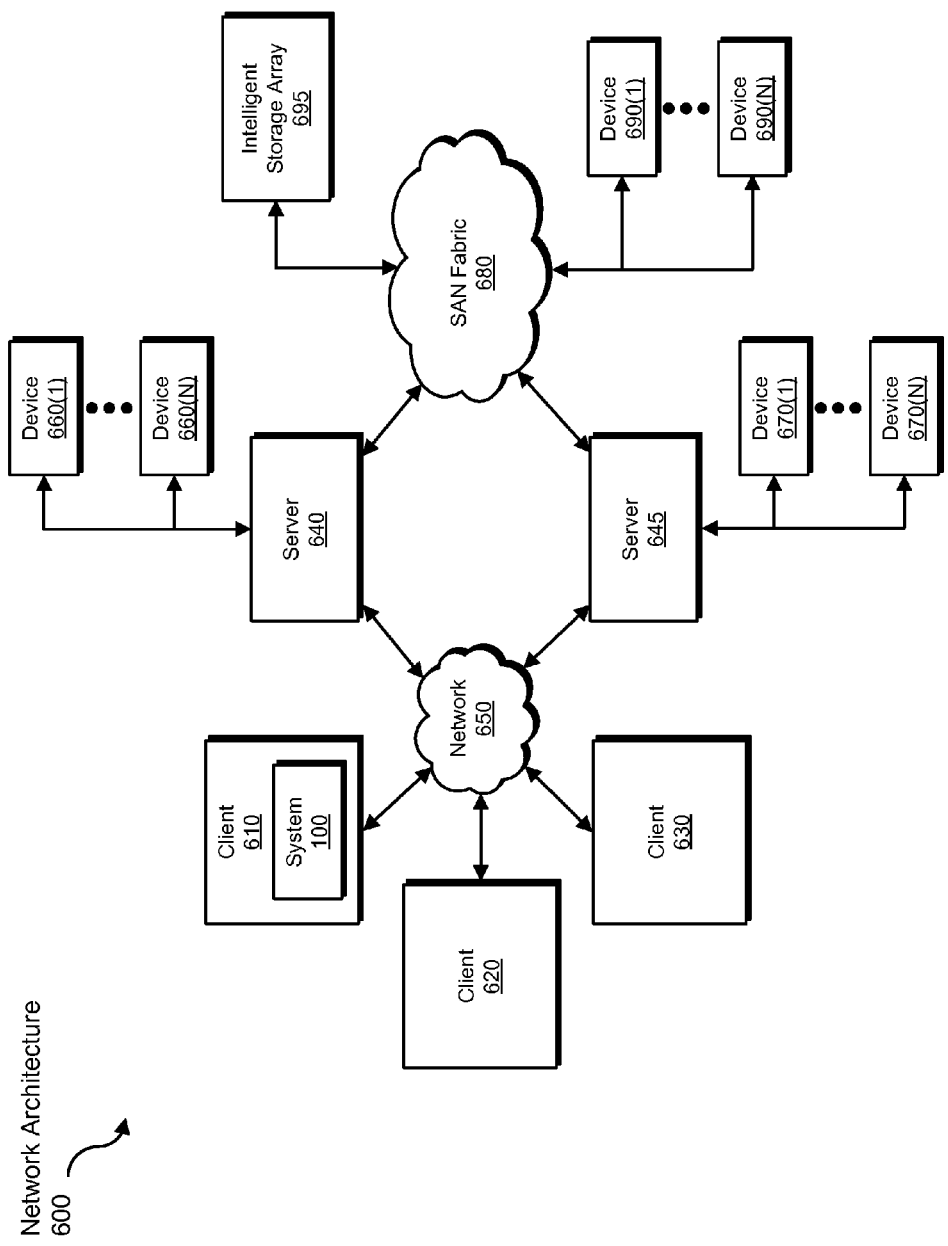
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting client types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a protocol-based communication to be transformed, transform the protocol-based communication into a distinguishing protocol implementation characteristic, use the distinguishing protocol implementation characteristic to ascertain a client type of a client system, and store the client type of the client system on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting client types, at least a portion of the method being performed by a computing device comprising at least one processor, the method comprising:
    identifying a communication from a client system transmitted according to a network protocol;
    analyzing the communication to determine at least one protocol implementation characteristic that describes how the client system implemented the network protocol in the communication, wherein the protocol implementation characteristic comprises a characteristic arising from an implementation of the network protocol that conforms to a specification of the network protocol but which is not required by the specification of the network protocol;
    submitting the protocol implementation characteristic to a protocol implementation database that correlates client types with protocol implementation characteristics, wherein the protocol implementation database was generated at least in part by:
        gathering a plurality of instances of communication via a protocol from a plurality of client systems and a plurality of client type identifiers from the plurality of client systems;
        analyzing the plurality of instances of communication to extract a plurality of protocol implementation features;
        statistically correlating the plurality of protocol implementation features with the plurality of client type identifiers;
    receiving, in response to submitting the protocol implementation characteristic, a client type of the client system.

2. The computer-implemented method of claim 1, further comprising restricting access to a resource from the client system based on the client type of the client system received from the protocol implementation database.

3. The computer-implemented method of claim 2, wherein restricting access to the resource from the client system comprises:
    determining a security attribute of the client system based on the client type of the client system;
    identifying an access policy that excludes client systems with the security attribute from accessing the resource.

4. The computer-implemented method of claim 1,
    wherein identifying the communication from the client system comprises receiving a user agent identifier from the client system purporting to identify the client type of the client system;
    further comprising determining that the user agent identifier was spoofed by comparing the user agent identifier with the client type of the client system and determining that the user agent identifier does not match the client type of the client system.

5. The computer-implemented method of claim 4, further comprising restricting access to a resource from the client system based on determining that the user agent identifier was spoofed.

6. The computer-implemented method of claim 4, further comprising identifying the communication as an intrusion attempt based at least in part on determining that the user agent identifier was spoofed.

7. The computer-implemented method of claim 1, wherein the client type comprises at least one of:
    an identifier of an application that sent the communication from the client system;
    an identifier of an operating system of the client system;
    an identifier of a hardware architecture of the client system;
    an identifier of a model of the client system.

8. A system for detecting client types, the system comprising:
    an identification module that identifies a communication from a client system transmitted according to a network protocol;
    an analyzing module that analyzes the communication to determine at least one protocol implementation characteristic that describes how the client system implemented the network protocol in the communication, wherein the protocol implementation characteristic comprises a characteristic arising from an implementation of the network protocol that conforms to a specification of the network protocol but which is not required by the specification of the network protocol;

a submission module that submits the protocol implementation characteristic to a protocol implementation database that correlates client types with protocol implementation characteristics, wherein the protocol implementation database was generated at least in part by:

gathering a plurality of instances of communication via a protocol from a plurality of client systems and a plurality of client type identifiers from the plurality of client systems;

analyzing the plurality of instances of communication to extract a plurality of protocol implementation features;

statistically correlating the plurality of protocol implementation features with the plurality of client type identifiers;

a receiving module that receives, in response to submitting the protocol implementation characteristic, a client type of the client system;

at least one processor configured to execute the identification module, the analyzing module, the submission module and the receiving module.

9. The system of claim 8, further comprising a restriction module that restricts access to a resource from the client system based on the client type of the client system received from the protocol implementation database.

10. The system of claim 9, wherein the restriction module restricts access to the resource from the client system by:

determining a security attribute of the client system based on the client type of the client system;

identifying an access policy that excludes client systems with the security attribute from accessing the resource.

11. The system of claim 8, wherein the identification module further receives a user agent identifier from the client system purporting to identify the client type of the client system;

wherein the receiving module further determines that the user agent identifier was spoofed by comparing the user agent identifier with the client type of the client system and determining that the user agent identifier does not match the client type of the client system.

12. The system of claim 11, further comprising a restriction module that restricts access to a resource from the client system based on determining that the user agent identifier was spoofed.

13. The system of claim 11, further comprising a restriction module that identifies the communication as an intrusion attempt based at least in part on determining that the user agent identifier was spoofed.

14. The system of claim 8, wherein the client type comprises at least one of:

an identifier of an application that sent the communication from the client system;

an identifier of an operating system of the client system;

an identifier of a hardware architecture of the client system;

an identifier of a model of the client system.

15. A non-transitory computer-readable-storage medium comprising one or more computer-readable instructions that, when executed by at least one processor of a computing device, cause the computing device to:

identify a communication from a client system transmitted according to a network protocol;

analyze the communication to determine at least one protocol implementation characteristic that describes how the client system implemented the network protocol in the communication, wherein the protocol implementation characteristic comprises a characteristic arising from an implementation of the network protocol that conforms to a specification of the network protocol but which is not required by the specification of the network protocol;

submit the protocol implementation characteristic to a protocol implementation database that correlates client types with protocol implementation characteristics, wherein the protocol implementation database was generated at least in part by:

gathering a plurality of instances of communication via a protocol from a plurality of client systems and a plurality of client type identifiers from the plurality of client systems;

analyzing the plurality of instances of communication to extract a plurality of protocol implementation features;

statistically correlating the plurality of protocol implementation features with the plurality of client type identifiers;

receive, in response to submitting the protocol implementation characteristic, a client type of the client system.

16. The non-transitory computer-readable-storage medium of claim 15, wherein the one or more computer-readable instructions further cause the computing device to restrict access to a resource from the client system based on the client type of the client system received from the protocol implementation database.

17. The non-transitory computer-readable-storage medium of claim 15, wherein the one or more computer-readable instructions further cause the computing device to restrict access to a resource from the client system based on the client type of the client system received from the protocol implementation database.

18. The non-transitory computer-readable-storage medium of claim 15, wherein identifying the communication from the client system comprises receiving a user agent identifier from the client system purporting to identify the client type of the client system;

wherein the one or more computer-readable instructions further cause the computing device to determine that the user agent identifier was spoofed by comparing the user agent identifier with the client type of the client system and determining that the user agent identifier does not match the client type of the client system.

19. The non-transitory computer-readable-storage medium of claim 18, wherein the one or more computer-readable instructions further cause the computing device to restrict access to a resource from the client system based on determining that the user agent identifier was spoofed.

20. The non-transitory computer-readable-storage medium of claim 18, wherein the one or more computer-readable instructions further cause the computing device to identify the communication as an intrusion attempt based at least in part on determining that the user agent identifier was spoofed.

* * * * *